(12) United States Patent
Vedula

(10) Patent No.: US 7,818,431 B2
(45) Date of Patent: Oct. 19, 2010

(54) EFFICIENT EXCHANGE OF SERVICE REQUESTS AND RESPONSES

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1516 days.

(21) Appl. No.: 10/904,321

(22) Filed: Nov. 3, 2004

(65) Prior Publication Data

US 2006/0112180 A1   May 25, 2006

(51) Int. Cl.
*G06F 15/16* (2006.01)
(52) U.S. Cl. .................. 709/227; 709/225; 709/245
(58) Field of Classification Search .......... 709/225, 709/227
See application file for complete search history.

(56) References Cited

U.S. PATENT DOCUMENTS

| 6,078,994 A | 6/2000 | Carey |
| 6,119,145 A | 9/2000 | Ikeda |
| 2004/0078486 A1 * | 4/2004 | Salahshoor et al. ......... 709/245 |
| 2004/0199636 A1 * | 10/2004 | Brown et al. ................ 709/227 |
| 2006/0031850 A1 * | 2/2006 | Falter et al. ................. 719/320 |

* cited by examiner

*Primary Examiner*—Hassan Phillips
*Assistant Examiner*—Glenford Madamba
(74) *Attorney, Agent, or Firm*—Narendra Reddy Thappeta

(57) ABSTRACT

A client system registers (with a server system) a service request format indicating the service identifier and the parameters (along with the sequence), and the server system responds with a registration identifier and a service response format specifying the parameters that will be contained in a corresponding service response. Thereafter, to request the service, the client system merely needs to send the parameter values along with the registration identifier. The server system merely sends the parameter values according to the response format. In an embodiment, the formats are generated as extensions to Simple Object Access Protocol (SOAP).

29 Claims, 9 Drawing Sheets

```
410: <?xml version="1.0" encoding="utf-8"?>
415: <soap:Envelope xmlns:xsi="http://www.w3.org/2001/XMLSchema-instance"
420:   xmlns:xsd="http://www.w3.org/2001/XMLSchema"
425:   xmlns:soap="http://schemas.xmlsoap.org/soap/envelope/">
430:   <soap:Body>
435:     <registerTemplate xmlns="http://webservices.mio.it/SendSms.asmx">
440:       <IDDistributor>$1</IDDistributor>
445:       <username>$2</username>
450:       <password>$3</password>
455:       <smsType>$4</smsType>
460:       <destination>$5</destination>
465:       <method> send </method>
470:     </registerTemplate>
475:   </soap:Body>
480: </soap:Envelope>
```

*FIG. 4*

```
510: <?xml version="1.0" encoding="utf-8"?>
515: <soap:Envelope xmlns:xsi="http://www.w3.org/2001/XMLSchema-instance"
520:   xmlns:xsd="http://www.w3.org/2001/XMLSchema"
525:   xmlns:soap="http://schemas.xmlsoap.org/soap/envelope/">
530:   <soap:Body>
535:     <registerResponse xmlns="http://webservices.mio.it/SendSms.asmx">
540:       <token>token-1-uuid</token>
545:       <responseParam1>$1</responseParam>
550:       <responseParam2>$2</responseParam>
555:     </registerResponse>
560:   </soap:Body>
```

610: Distributor1
620: user1
630: Password
640: Simple
650: Germany
660: RegistrationId1

FIG. 7

710: OK
720: DONE

```
801: <?xml version="1.0" encoding="utf-8" ?>
802: <definitions xmlns:http="http://schemas.xmlsoap.org/wsdl/http/"
803:     xmlns:soap="http://schemas.xmlsoap.org/wsdl/soap/"
804:     xmlns:s="http://www.w3.org/2001/XMLSchema"
805:     xmlns:s0="http://webservices.mio.it/SendSms.asmx"
806:     xmlns:soapenc="http://schemas.xmlsoap.org/soap/encoding/"
807:     xmlns:tm="http://microsoft.com/wsdl/mime/textMatching/"
808:     xmlns:mime="http://schemas.xmlsoap.org/wsdl/mime/"
809:     targetNamespace="http://webservices.mio.it/SendSms.asmx"
810:     xmlns="http://schemas.xmlsoap.org/wsdl/">
811:     <types>
812:         <s:schema elementFormDefault="qualified"
813:             targetNamespace="http://webservices.mio.it/SendSms.asmx">
814:             <s:element name="send">
815:                 <s:complexType>
816:                     <s:sequence>
817:                         <s:element minOccurs="0" maxOccurs="1" name="IDDistributore"
818:                             type="s:string" />
819:                         <s:element minOccurs="0" maxOccurs="1" name="username"
820:                             type="s:string" />
821:                         <s:element minOccurs="0" maxOccurs="1" name="password"
822:                             type="s:string" />
823:                         <s:element minOccurs="0" maxOccurs="1" name="smsType" type="s:string"
824:                         <s:element minOccurs="0" maxOccurs="1" name="destinatario"
825:                             type="s:string" />
826:
827:
```

FIG. 8A

```
828:        </s:sequence>
829:       </s:complexType>
830:      </s:element>
831:      <s:element name="sendResponse">
832:       <s:complexType>
833:        <s:sequence>
834:         <s:element minOccurs="0" maxOccurs="1" name="responseParam1"
              type="s:string" />
835:         <s:element minOccurs="0" maxOccurs="1" name="responseParam2"
              type="s:string" />
836:        </s:sequence>
837:       </s:complexType>
838:      </s:element>
839:      <s:element name="string" nullable="true" type="s:string" />
840:     </s:schema>
841:    </types>
842:    <message name="sendSoapIn">
843:     <part name="parameters" element="s0:send" />
844:    </message>
845:    <message name="sendSoapOut">
846:     <part name="parameters" element="s0:sendResponse" />
847:    </message>
848:    <portType name="SendSmsSoap">
```

FIG. 8B

```
852:    <operation name="send">
853:        <input message="s0:sendSoapIn" />
854:        <output message="s0:sendSoapOut" />
855:    </operation>
856: </portType>
857: <binding name="SendSmsSoap" type="s0:SendSmsSoap">
858:
859:    <soap:binding transport="http://schemas.xmlsoap.org/soap/http"
860:        style="document" />
861:    <operation name="send">
862:        <soap:operation soapAction="http://webservices.mio.it/SendSms.asmx/send"
863:            style="document" />
864:        <input>
865:            <soap:body use="literal" />
866:        </input>
867:        <output>
868:            <soap:body use="literal" />
869:        </output>
870:    </operation>
871: </binding>
872: <service name="SendSms">
873:    <port name="SendSmsSoap" binding="s0:SendSmsSoap">
874:        <soap:address location="http://webservices.mio.it/SendSms.asmx" />
875:    </port>
876: </service>
877: </definitions>
```

*FIG. 8C*

EFFICIENT EXCHANGE OF SERVICE REQUESTS AND RESPONSES

BACKGROUND OF THE INVENTION

1. Field of the Invention

The present invention relates to computer systems exchanging data, and more specifically to a method and apparatus for reducing overhead when service requests and responses are exchanged between such computer systems.

2. Related Art

Systems are often designed to send various service requests and receive corresponding responses. For clarity, the system requesting a service (by sending a service request) is generally referred to as a client system, and the system processing the service request and providing the response is referred to as a server system.

In general, a server system offers severed services, and accordingly a service request contains a service identifier (uniquely identifying the service, for example, in the form of a name of the service). The service request may also contain various parameter values which are used in processing the service request.

There is a general need to reduce various types of overhead (e.g., processing or amount of data exchanged) when such service requests and responses are exchanged between the server and client systems. An example scenario where such a need exists is when structured representations facilitate the exchange of service requests and responses. A structured representation generally refers to an approach in which tags are associated with the user data (i.e., substantive data sought to be communicated for use by user applications) to indicate various attributes (e.g., what the data represents, how the data is to be displayed) of the user data.

Thus, in the context of a service request, some tags specify that the associated user data portion represents a service identifier and another tag indicates what an associated parameter value represents (e.g., customer name or quantity). Simple Object Access Protocol (SOAP) represents an example protocol which is based on eXtended Markup Language (XML) (an example of a structured representation). Other such protocols include, but not limited to, CORBA (Common Object Request Broker Architecture) and RMI (Remote Method Invocation) well known in the relevant arts.

In general, such protocols and representations provide various advantages such as facilitating service requests and processing between disparate client and server systems implemented by independent parties. In addition, since the tags specify what the associated user data portion represents, various data portions of interest can be sent in any desired sequence.

However, various overheads are often presented due to the use of such protocols and representations. For example, a server system needs to parse the data representing a service request according to XML/SOAP specified conventions to interpret the user data, and a client system needs to package user data according to the same convention. Such parsing and packaging generally adds to the processing overhead. Similarly, the presence of additional data tags adds to the data transfer overhead on networks.

Accordingly, what is needed is a method and apparatus which enables such overhead to be reduced when service requests and responses are exchanged using protocols based on structured representation.

BRIEF DESCRIPTION OF THE DRAWINGS

The present invention will be described with reference to the accompanying drawings briefly described below.

FIG. 4 depicts an example service request format generated by a client system.

FIG. 5 depicts an example of a corresponding service response format generated by a server system.

FIG. 6 depicts an example of the content of a service request sent once the corresponding service is registered with the server system.

FIG. 7 depicts an example of the content of a response once the response is registered with the client system.

FIGS. 8A-8C together contain a service definition file which is used by a server system and a client system to generate the service request format and the service response format respectively in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A client system provided according to an aspect of the present invention sends (to a server system providing a service) a service request format indicating a service identifier and the identifiers of parameters that will be sent in the indicated sequence. The service identifier and the identifiers of parameters are indicated according to a protocol (e.g., SOAP) which represents the service identifier and parameters according to a structured representation (e.g., XML).

The client system that receives a registration identifier from the server system corresponding to the service request format. The client system can then merely send the registration identifier and the parameter values in the same sequence as in the service request format. The server system provides the service associated with the registration identifier using the parameter values.

The server system may also similarly indicate a service response format while providing the registration identifier. The service response format may indicate (according to the same protocol, i.e., SOAP in the example above) the manner in which various data values of interest (resulting from providing the service) will be provided.

As a result, once the service request format and service response format are exchanged, neither of the client system and the server system may need to package data according to structured representation. Processing overhead (in terms of parsing and packaging) and transmission overhead (due to reduced data that is transmitted) is reduced as a result in both the client system and the server system.

Various aspects of the present invention are described below with reference to an example problem. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the present invention.

2. Example Environment

Figure 1:
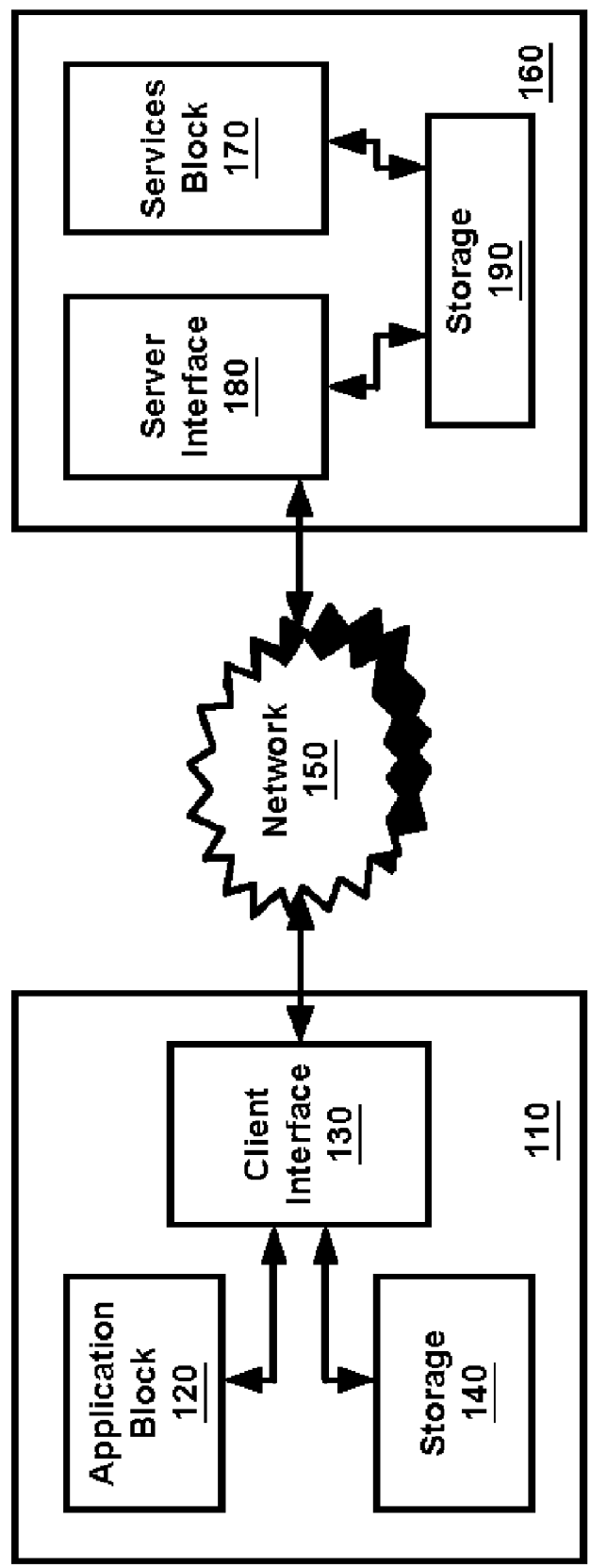
FIG. 1 is a block diagram of an example environment in which various aspects of the present invention can be implemented.

FIG. 1 is a block diagram illustrating an example environment in which various aspects of the present invention can be implemented. The environment is shown containing client system 110 and server system 160 communicating with each other over network 150. Network 150 may be implemented using protocols such as Internet Protocol.

Server system 160 provides various services, which can be accessed by client system 110 via network 150. In an embodiment, server system 160 contains services block 170, server interface 180 and storage 190, and client system 110 contains application block 120, client interface 130 and storage 140, as shown in FIG. 1.

The components of server system 160 and client system 110 are described in further detail below while describing the manner in which various aspects of the present invention reduce the overhead on client system 110 and server system 160 while the services provided by server system 160 are used.

3. Reducing Overhead

Figure 2:
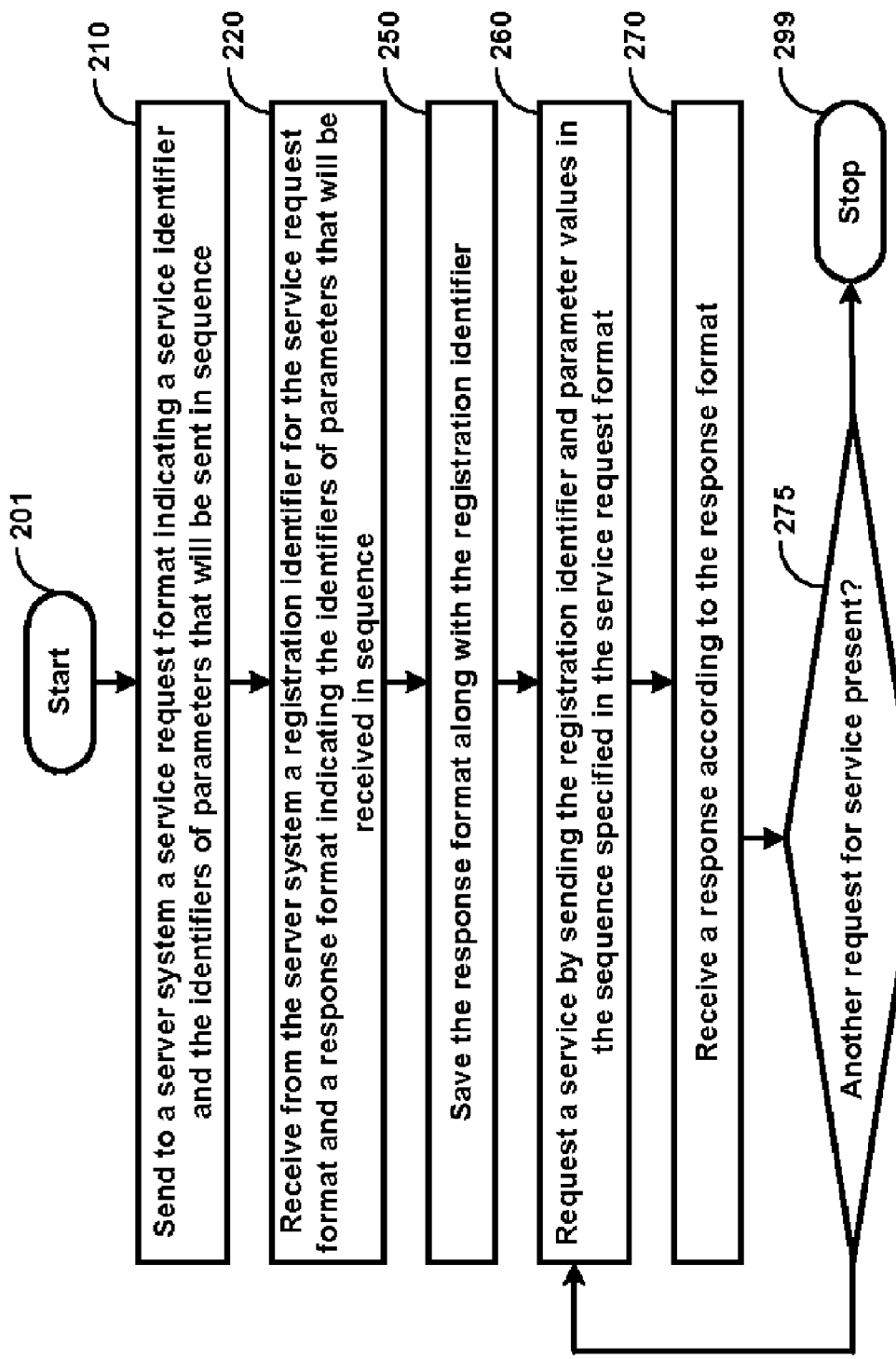
FIG. 2 is a flow-chart illustrating the manner in which an embodiment of a client system may operate according to various aspects of the present invention.

FIG. 2 is a flow-chart illustrating the manner in which a client system operates to reduce overhead in both itself and server systems while accessing the services provided by server systems. The flow chart is described with reference to FIG. 1 merely for illustration. However, the features can be implemented in other environments as well. The flow chart begins in step 201, in which control immediately passes to step 210.

In step 210, client interface 130 sends (to server system 160) a service request format indicating a service identifier and the identifiers as parameters that will be sent in sequence while accessing the service associated with the service identifier. The service identifier and the identifiers of parameters are indicated according to a protocol (e.g., SOAP) which represents the service identifier and parameters according to a structured representation (e.g., XML).

In step 220, client interface 130 receives (from server system 160) a registration identifier for the service request format. Client interface 130 may further receive a response format indicating the identifiers of parameters that will be received in sequence from server system 160 in response to service requests.

In step 250, client interface 130 saves the response format along with the registration identifier in storage 140. The service request format can also be stored in storage 140, such that multiple instances of (independent) applications can potentially access storage 140 and present service requests to server system 160, as described below.

In step 260, application block 120 requests the service corresponding to the service identifier of step 210 by sending the registration identifier and parameter values in the sequence specified in the service request format. It may be appreciated that the need for various tags is eliminated due to the registration of the service request format. The data stored in storage 140 can be used in generating the service requests.

In step 270, application block 120 receives a response (after server system 160 completes processing the service request) according to the response format stored in storage 140. The data in the response may be processed further according to a desired business logic. In step 275, control passes to step 260 if at least one additional service request (with the same service identifier) is present and to step 299 otherwise. The method ends in step 299.

Thus, the overhead on client system 110 and network 110 is reduced due to the operation of the flow-chart of FIG. 2. Server system 160 generally needs to be implemented to provide such efficiencies. The manner in which server system 160 may operate is described below with reference to FIG. 3

4. Server System

Figure 3:
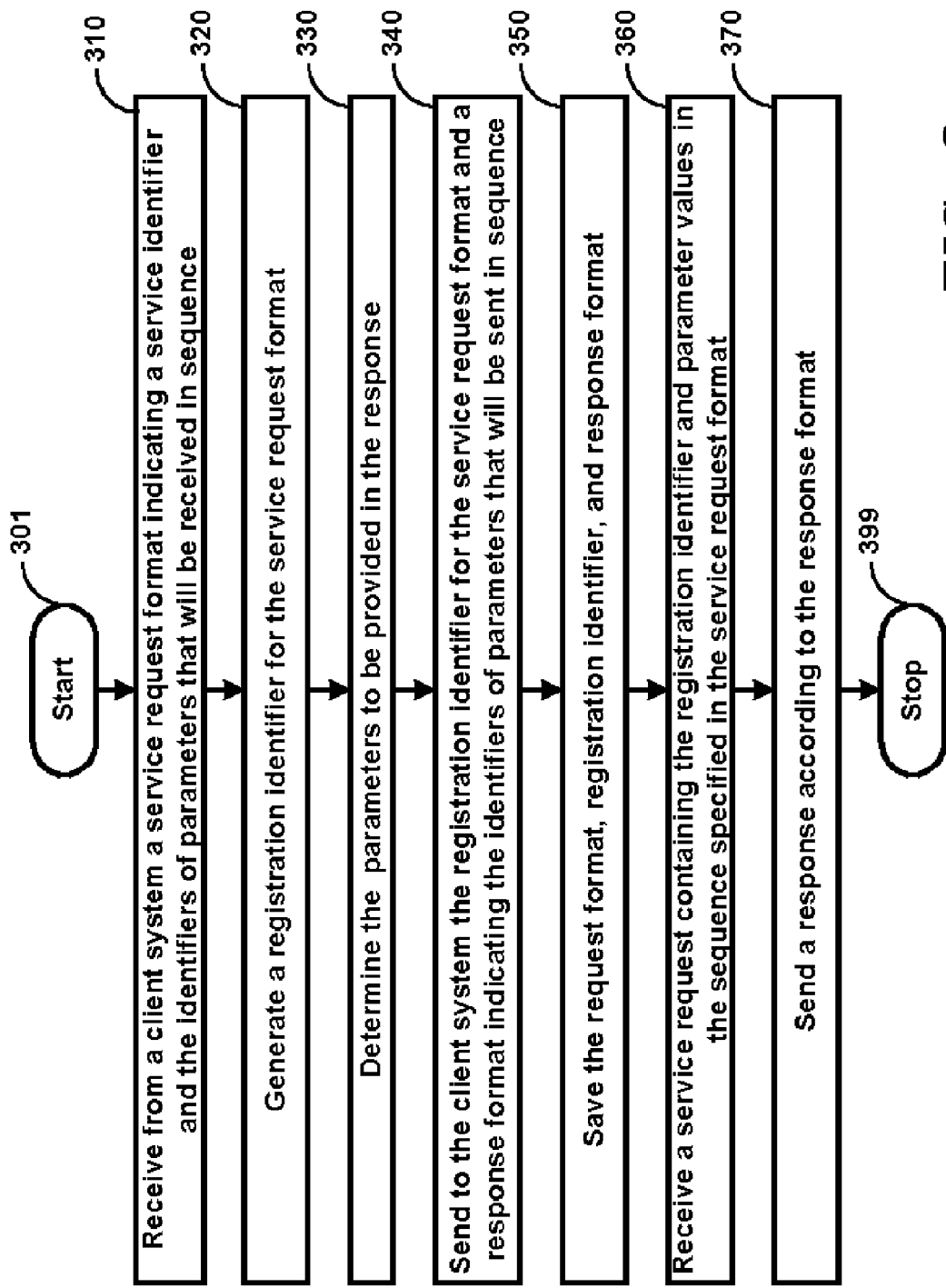
FIG. 3 is a flow-chart illustrating the manner in which an embodiment of a server system may operate according to various aspects of the present invention.

FIG. 3 is a flow-chart illustrating the manner in which a server system operates to reduce overhead in both itself and client systems while accessing the services provided by the server system. The flow chart is described with reference to FIG. 1 merely for illustration. However, the features can be implemented in other environments as well. The flow chart begins in step 301, in which control immediately passes to step 310.

In step 310, server interface 180 receives a service request format indicating a service identifier and the identifiers of parameters that will be received in sequence (in subsequent service requests). In step 320, server interface 180 generates a registration identifier for the service request format. The registration identifier along with the service request format.

In step 330, server interface 180 determines the parameters to be provided in the response. The parameters are generally determined based on the service definition. An example approach to determine the parameters is described below in further detail.

In step 340, server interface 180 sends the registration identifier for the service request format along with a response format indicating the identifiers of parameters that will be sent in sequence. In addition, in step 350, server interface 180 saves the request format, registration identifier, and response format in storage 190 for later access by instances of the services blocks providing the same service. Registration of the service is said to be complete once such storing occurs and the service response format is successfully received by client system 110.

In step 360, server interface 180 receives a service request containing the registration identifier and parameter values in the sequence specified in the service request format. Server interface 180 determines the specific service to be provided based on the corresponding service identifier (retrieved from storage 190) and interfaces with services block 170 to execute the corresponding software instructions.

In step 370, server interface 180 sends a response according to the response format. The parameters values for the response are generated by the execution referred with respect to step 360 above. The method the ends in step 399. Thus, due to the operation of server system 160 according to the flow-chart of FIG. 3, various efficiencies may be attained. The description is continued with respect to an example transaction between client system 110 and server system 160 in an embodiment of the present invention.

5. Example Transaction

FIGS. 4-7 together illustrate the details of an example transaction performed by client system 110 and server system 160 in an embodiment of the present invention. In particular, FIG. 4 depicts an example service request format, FIG. 5 depicts an example service response format, FIG. 6 depicts the manner in which a service request is presented after the registration is complete, FIG. 7 depicts the corresponding response.

Each of the FIGS. 4-7 is described below in further detail. For conciseness, only the relevant portions of the Figures are described. For additional understanding of the entire Figures, the reader is referred to the description of SOAP, which described in further detail in W3C Recommendation document entitled, "SOAP 1.2 Part 1: Messaging Framework", Martin Gudgin, Marc Hadley, Jean-Jacques Moreau, Henrik Frystyk Nielsen, 24 Jun. 2003 (See http://www.w3.org/TR/2003/REC-soap12-part1-20030624/).

FIG. 4 depicts a service request format sent by client system 110 to server system 160 to register a service. Line 410 specifies the XML version number and encoding format. Line 415 indicates that the message is wrapped in an envelope whose format adheres to the SOAP envelope standard. This standard is identified by a XML name space http://www.w3.org/2001/XMLSchema-instance, as shown.

Line 420 indicates that the parameters in the SOAP message body shall be encoded using the xsd encoding standard. The xsd encoding standard is identified by the XML name space http://www.w3.org/2001/XMLSchema. Line 425 indicates that the XML message is structured as per the format specified by the SOAP standard. This SOAP standard is identified by the XML name space http://schemas.xmlsoap.org/soap/envelope/.

Lines 430-475 contains the body of the message according to SOAP protocol, and a register template portion (provided according to an aspect of the present invention) is contained between lines 435 and 470, as shown by the corresponding begin and end tags. Line 465 indicates the service identifier is 'send' (and represents a method to be executed on server system 160).

The corresponding parameter identifiers are also shown specified in lines 440, 445, 450, 455 and 460 and the sequence in which they are going to be presented is indicated by the parameter number ($1 indicates first parameter). Thus, the sequence of parameters is identified as IDDistributor, username, password, smsType, and destination.

FIG. 5 depicts the service response format sent by server system 160 to client system 110 in response to the service request registration of FIG. 4. Lines 510-525 are described similar to lines 410-425 respectively. Lines 530-560 contain the body of the message according to SOAP protocol and register response portion is shown between lines 535 and 555. Line 540 contains the registration identifier (shown as test token-1-uuic1). As shown in lines 545 and 550, the responses are expected to contain two parameters.

FIG. 6 depicts the manner in which client system 110 can present a service request once the registration (as depicted above with reference to FIGS. 4 and 5) is complete. Consistent with the service request format of FIG. 4, client interface 130 sends the six lines of data to server interface 180. The last line contains the registration identifier (as represented by registration1 d1) received earlier during registration of the service.

FIG. 7 depicts the response containing two parameter values OK and DONE in lines 710 and 720 respectively, consistent with the service response format at FIG. 5. It is assumed that the execution of the procedure identified as 'send' generated the two values.

At least based on the above transaction, it may be appreciated that the parsing and other processing overhead is reduced in client system 110 as well as server system 160. In addition, the data transfer requirements on network 150 are also reduced.

The features described above can be implemented using various approaches and in different environments depending on the specific requirements. Some implementation considerations in an example environment are described below in further detail.

6. Implementation Considerations

In one embodiment, server system 160 supports Java Application environment described in further detail in a book entitled, "Java™: The Complete Reference, Fifth Edition" by Herbet Schildt, ISBN Number: 0-07-049543-2. In such an environment, server interface 180 in server system 160 creates an object according to the service request format. An object corresponding to the service request format of FIG. 4 is shown below.

```
Class Request
{
    String IDDistributor;
    String username;
    String password;
    Long smsType;
    String destination;
}
```

Server interface 180 then needs to match the specific parameter values received with service requests (e.g., of FIG. 6) with the Object definition of above, and interface with services block 170 to execute the procedure(s) providing the service ('send' in the case of FIG. 4). Such execution generally depends on the implementation environment, and will be apparent to one skilled in the relevant arts.

In addition, as noted above, client interface 130 generates a service request format and server interface 180 generates a service response format. The formats are merely illustrative and can be extended further. For example, a service request may contain identifier. Such a feature enables multiple service requests to be pending/queued while being processed in server system 160.

Also, various techniques can be employed to generate the service request and response formats. In one embodiment, server system 160 maintains a WSDL (Web Services Description Language) file (an example of a service definition file), and the service definition file is examined to generate the formats. The WSDL file is made available according to a pre-specified convention (e.g., at a known URL), and both client system 110 and server system 160 can access the file.

7. Examining Service Definition File

FIGS. 8A-8C together contain a WSDL file in XML. Only the details of WSDL and WSDL file as relevant to an understanding of some features of the present invention are described here. For further details, the reader is referred to a document entitled, "Web Services Description Language (WSDL) 1.1" available from the W3C consortium Massachusetts Institute of Technology (MIT), Computer Science and Artificial Intelligence Laboratory (CSAIL), 32 Vassar Street, Room 32-G515, Cambridge, Mass. 02139, USA, Telephone: +1.617.253.2613, and is available from http://www.w3.org/TR/wsdl.

The tag type 'portType' would contain the names of all services provided by server system 160. The tag type 'Operation' would then specify a corresponding service. The body of Operation tag further specify the input parameters and output parameters for the service. Thus, lines 850-856 contain the definition of portType tag, and lines 852-855 contain the definition of service with name 'send'. The body of Operation tag specifies input and output formats as well.

Accordingly, client interface 130 may examine the WSDL file of portType tag (lines 850-856), and for Operation tags within the portType tag. Line 852 indicates the beginning of definition corresponding to service 'send'. The input tag indicates that the parameters used as inputs for the service are indicated in message tag entitled sendSoapIn (line 853). The sendSoapin message tag is defined in lines 844-846, which further indicates that the parameters are defined by a tag type of element with the name send (line 845). Lines 815-830 contain the body of the corresponding tag, and indicates there are four parameters, each with a minimum and maximum occurrences of 0 and 1 respectively. Client interface 130 parses the WSDL file according to such conventions to determine the service request format.

On the other hand, server interface 180 examines the output tag (line 854) which indicates that the parameters provided as a response by the service are in the message tag entitled sendSoapOut. Lines 847-849 contain the body of the corresponding tag, and indicate the parameters are specified in the corresponding tag having the name sendResponse (line 848). Lines 831-840 contain the body of the corresponding tag, and indicates that there are two parameters in the response. Server interface 180 accordingly parses the WSDL file.

It may be appreciated that the WSDL file contains various other details such as identifier of the executable file to provide a corresponding service request (line 862). It should be understood that some service registrations can have a different number of parameters or the parameters in different sequences, as suitable for specific situations.

Also, server system 160 and client system 110 can be implemented using various approaches. In one embodiment, various features described above are operative when software instructions are executed on a digital processing system, and the details of a corresponding embodiment are described below in further detail.

8. Digital Processing System

Figure 9:
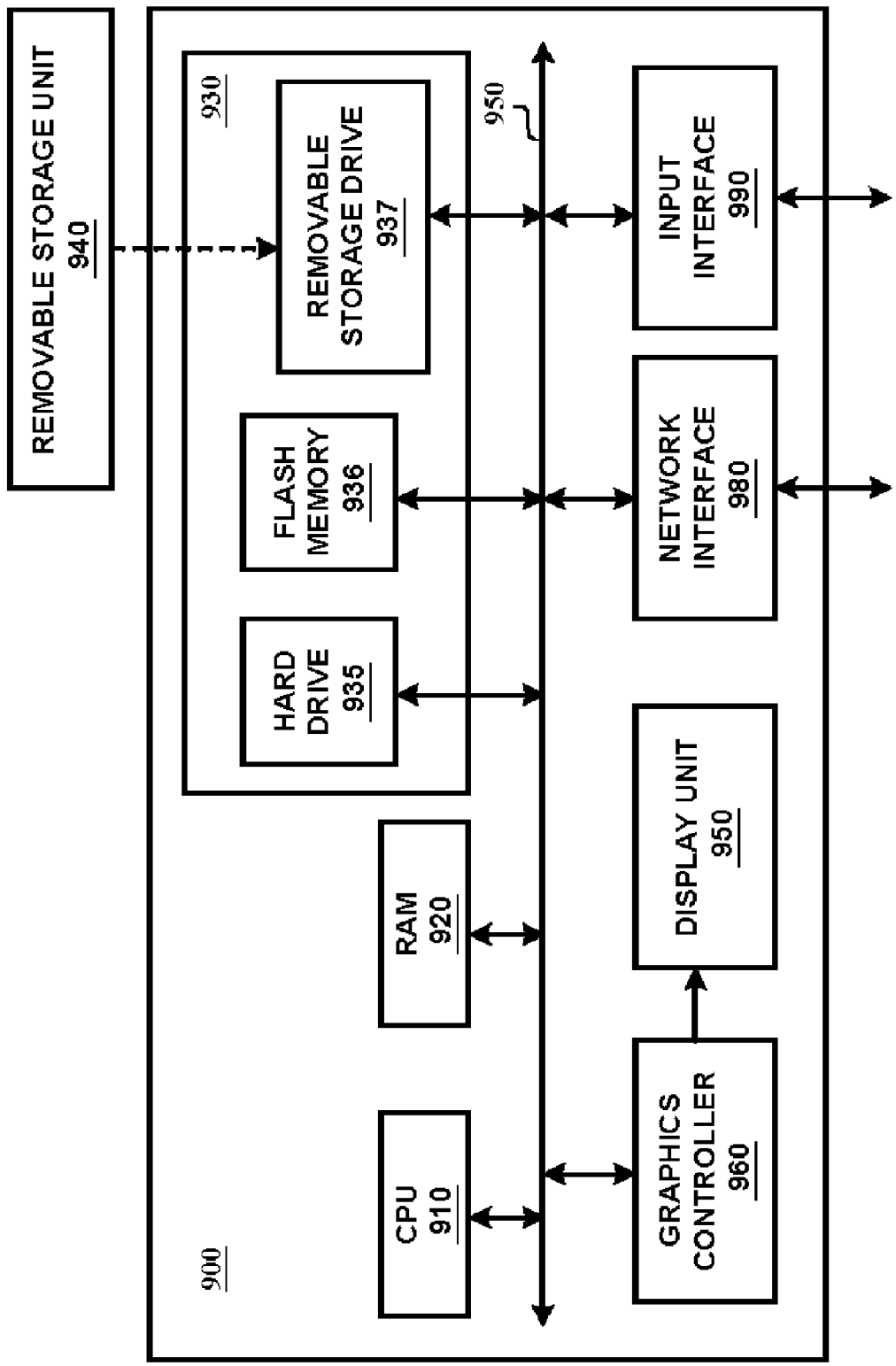
FIG. 9 is a block diagram illustrating an example embodiment in which various aspects of the present invention are operative when software instructions are executed.

FIG. 9 is a block diagram illustrating the details of digital processing system 900 in which various aspects of the present invention are operative by execution of appropriate software instructions. System 900 may correspond to one or both of server system 160 and client system 110. System 900 may contain one or more processors such as central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary memory 930 using communication path 950.

Graphics controller 960 generates display signals (e.g., in RGB format) to display unit 970 based on data/instructions received from CPU 910. Display unit 970 contains a display screen to display the images defined by the display signals. Input interface 990 may correspond to a key-board and/or mouse. Network interface 980 provides connectivity to a network (e.g., using Internet Protocol), and may be used to receive various service requests, formats and to provide the corresponding responses.

Secondary memory 930 may contain hard drive 935, flash memory 936 and removable storage drive 937. Secondary memory 930 may store the data and software instructions (e.g., methods instantiated by each of client system), which enable system 900 to provide several features in accordance with the present invention. Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EEPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data.

In this document, the term "computer program product" is used to generally refer to removable storage unit 940 or hard disk installed in hard drive 935. These computer program products are means for providing software to system 900. CPU 910 may retrieve the software instructions, and execute the instructions to provide various features of the resent invention described above.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of executing a service on a server system, said service requiring a first plurality of parameters as inputs, each of said first plurality of parameters being identified by a corresponding one of a first plurality of parameter identifiers in said server system, said method comprising:

sending, from a client system, to said server system a service request format indicating a service identifier and said first plurality of parameter identifiers in a first sequence, wherein said service identifier identifies said service;

receiving, in said client system, from said server system a registration identifier for said service request format in response to said sending of said service request format;

requesting, from said client system, said service by sending said registration identifier and a plurality of parameter values respectively corresponding to said first plurality of parameters, said plurality of parameter values being in the same sequence as the corresponding ones of said first plurality of parameter identifiers in said first sequence specified in said service request format, wherein said requesting is performed after said receiving said registration identifier from said server system and wherein said first plurality of parameter identifiers are not included by said client system when requesting said server system for said service;

requesting, from another client system said same service from said server system, by sending the same set of parameters in corresponding different sequences.

2. The method of claim 1, wherein said service generates a second plurality of parameters as outputs, each of said second plurality of parameters being identified by a corresponding one of a second plurality of parameter identifiers, wherein said receiving further receives a service response format indicating said second plurality of parameter identifiers in a second sequence, said method further comprising receiving from said server system a response to said requesting said service, said response comprising a second plurality of parameter values respectively corresponding to said second plurality of parameters, said second plurality of parameter values being in the same sequence as the corresponding ones of said second plurality of parameter identifiers in said second sequence specified in said service response format, whereby said second plurality of parameter identifiers are not included in said response by said server system.

3. The method of claim 2, further comprising saving said service response format along with said registration identifier in a memory in said client system.

4. The method of claim 2, wherein said service request format and said service response format are according to extended markup language (XML), wherein each of said first plurality of parameter identifiers and said second plurality of parameter identifiers represents a corresponding tag according to said XML, wherein said plurality of parameter values in said requesting of said service and said second plurality of parameter values in said response are not encoded according to said XML.

5. The method of claim 4, wherein said service request format and said service response format are according to Simple Object Access Protocol (SOAP).

6. The method of claim 5, wherein said service is defined in a service definition file said method further comprises examining in said client system said service definition file to generate said service request format.

7. The method of claim 6, wherein said service definition file is provided according to WSDL.

8. A method of providing a service on a server system, said service requiring a first plurality of parameters as inputs, each of said first plurality of parameters being identified by a corresponding one of a first plurality of parameter identifiers in said server system, said method comprising:

receiving from a client system a service request format indicating a service identifier and said first plurality of parameter identifiers in a first sequence, wherein said service identifier identifies said service;

receiving from said client system a request for said service after receiving said service request format, wherein said request comprises a plurality of parameter values respectively corresponding to said first plurality of parameters, said plurality of parameter values being in the same sequence as the corresponding ones of said first plurality of parameter identifiers in said first sequence specified in said service request format, wherein said first plurality of parameter identifiers are not included in said request for said service by said client system; and receiving from another client system a different number of parameters for the same said service.

9. The method of claim 8, wherein said service generates a second plurality of parameters as outputs, each of said second plurality of parameters being identified by a corresponding one of a second plurality of parameter identifiers, said method further comprising:

sending to said client system a registration identifier for said service request format and a service response format in response to said receiving of said service request format, said service response format indicating said second plurality of parameter identifiers in a second sequence, wherein said request is received after said sending and wherein said request contains said registration identifier;

processing said request in said server system to generate a second plurality of parameter values corresponding to said second plurality of parameters; and sending to said client system a response to said request according to said service response format, said response comprising said second plurality of parameter values corresponding to said second plurality of parameters, said second plurality of parameter values being in the same sequence as the corresponding ones of said second plurality of parameter identifiers in said second sequence specified in said service response format, whereby said second plurality of parameter identifiers are not included in said response by said server system.

10. The method of claim 9, further comprising generating in said server system said registration identifier.

11. The method of claim 9, further comprising saving said service request format along with said registration identifier in a memory in said server system.

12. The method of claim 11, wherein said service request format and said service response format are according to extended markup language (XML), wherein said each of said first plurality of parameter identifiers and said second plurality of parameter identifiers represents a corresponding tag according to said XML, wherein said plurality of parameter values in said request for said service and said second plurality of parameter values in said response are not encoded according to said XML.

13. The method of claim 12, wherein said service request format and said service response format are according to Simple Object Access Protocol (SOAP).

14. The method of claim 13, wherein said service is defined in a service definition file said method further comprises examining in said server system said service definition file to generate said service response format.

15. The method of claim 14, wherein said service definition file is provided according to (WSDL).

16. A non-transitory computer readable medium storing one or more sequences of instructions for causing a client system to execute a service on a server system, said service requiring a first plurality of parameters as inputs, each of said first plurality of parameters being identified by a corresponding one of a first plurality of parameter identifiers in said server system, wherein execution of said one or more sequences of instructions by one or more processors contained in said client system causes said client system to perform the actions of:
  sending to said server system a service request format indicating a service identifier and said first plurality of parameter identifiers in a first sequence, wherein said service identifier identifies said service;
  receiving from said server system a registration identifier for said service request format in response to said sending of said service request format; and
  requesting said service by sending said registration identifier and a plurality of parameter values respectively corresponding to said first plurality of parameters, said plurality of parameter values being in the same sequence as the corresponding ones of said first plurality of parameter identifiers in said first sequence specified in said service request format,
  wherein said requesting is performed after said receiving said registration identifier from said server system, and
  wherein said first plurality of parameter identifiers are not included when requesting said server system for said service by said client system.

17. The computer readable medium of claim 16, wherein said service generates a second plurality of parameters as outputs, each of said second plurality of parameters being identified by a corresponding one of a second plurality of parameter identifiers,
  wherein said receiving further receives a service response format indicating said second plurality of parameter identifiers in a second sequence,
  said computer readable medium further comprising one or more instructions for receiving from said server system a response to said requesting said service, a second plurality of parameter values respectively corresponding to said second plurality of parameters, said second plurality of parameter values being in the same sequence as the corresponding ones of said second plurality of parameter identifiers in said second sequence specified in said service response format,
  whereby said second plurality of parameter identifiers are not included in said response.

18. The computer readable medium of claim 17, further comprising one or more instructions for saving said service response format along with said registration identifier in a memory in said client system.

19. The computer readable medium of claim 17, wherein said service request format and said service response format are according to extended markup language (XML),
  wherein said each of said first plurality of parameter identifiers and said second plurality of parameter identifiers represents a corresponding tag according to said XML,
  wherein said plurality of parameter values in said requesting of said service and said second plurality of parameter values in said response are not encoded according to said XML.

20. The computer readable medium of claim 19, wherein said service request format and said service response format are according to Simple Object Access Protocol (SOAP).

21. The computer readable medium of claim 20, wherein said service is defined in a service definition file, further comprising one or more instructions for examining in said client system said service definition file to generate said service request format.

22. The computer readable medium of claim 21, wherein said service definition file is provided according to WSDL.

23. A non-transitory computer readable medium storing one or more sequences of instructions for causing a server system to provide a service, wherein said service generates a second plurality of parameters as outputs, each of said second plurality of parameters being identified by a corresponding one of a second plurality of parameter identifiers, wherein execution of said one or more sequences of instructions by one or more processors contained in said server system causes said server system to perform the actions of:
  sending to a client system a service response format indicating said second plurality of parameter identifiers in a second sequence;
  receiving a request for said service, wherein said request comprises a registration identifier and a plurality of parameter values respectively corresponding to a first plurality of parameters required as inputs for said service;
  processing said request in said server system to generate a second plurality of parameter values corresponding to said second plurality of parameters; and
  sending to said client system a response according to said service response format, said response comprising said second plurality of parameter values corresponding to said second plurality of parameters, said second plurality of parameter values being in the same sequence as the corresponding ones of said second plurality of parameter identifiers in said second sequence specified in said service response format,
  wherein said second plurality of parameter identifiers are not included in said response.

24. The computer readable medium of claim 23, further comprising one or more instructions for:
  receiving from said client system a service request format indicating a service identifier and a first plurality of parameter identifiers in a first sequence, each of said first plurality of parameter identifiers identifying a corresponding one of said first plurality of parameters in said server system, wherein said service identifier identifies said service,
  wherein said sending sends said registration identifier to said client system in response to said receiving said service request format; and
  saving said service request format along with said registration identifier in a memory in said server system.

25. The computer readable medium of claim 24, further comprising one or more instructions for generating in said server system said registration identifier.

26. The computer readable medium of claim 24, wherein said service request format and said service response format are according to extended markup language (XML),
  wherein said each of said first plurality of parameter identifiers and said second plurality of parameter identifiers represents a corresponding tag according to said XML,
  wherein said plurality of parameter values in said requesting of said service and said second plurality of parameter values in said response are not encoded according to said XML.

27. The computer readable medium of claim 26, wherein said service request format and said service response format are according to Simple Object Access Protocol (SOAP).

28. The computer readable medium of claim 27, wherein said service is defined in a service definition file said computer readable medium further comprising one or more instructions for examining in said server system said service definition file to generate said service response format.

29. The computer readable medium of claim 28, wherein said service definition file is provided according to WSDL.

* * * * *

UNITED STATES PATENT AND TRADEMARK OFFICE
CERTIFICATE OF CORRECTION

| | | |
|---|---|---|
| PATENT NO. | : 7,818,431 B2 | |
| APPLICATION NO. | : 10/904321 | |
| DATED | : October 19, 2010 | |
| INVENTOR(S) | : Venkata Naga Ravikiran Vedula | |

It is certified that error appears in the above-identified patent and that said Letters Patent is hereby corrected as shown below:

In column 2, line 55, delete "that" and insert -- then --, therefor.

In column 3, line 53, delete "as" and insert -- of --, therefor.

In column 4, line 23, after "3" insert -- . --.

In column 4, line 40, after "identifier" insert -- can be any unique number or character string. In an alternative embodiment, client system 110 generates such a registration identifier and sends the identifier --.

In column 4, line 64, delete "parameters" and insert -- parameter --, therefor.

In column 4, line 66, delete "the" and insert -- then --, therefor.

In column 5, line 19, after "which" insert -- is --.

In column 5, line 61, delete "uuicl)." and insert -- uuid). --, therefor.

In column 6, line 2, delete "registrationl d1)" and insert -- registration Id1) --, therefor.

In column 6, line 6, delete "at" and insert -- of --, therefor.

In column 6, line 52, after "contain" insert -- a unique identifier of the request and the response may also contain the --.

In column 6, line 52, delete "enables" and insert -- endoles --, therefor.

In column 7, line 42, after "as" insert -- the --.

Signed and Sealed this
Twenty-third Day of August, 2011

David J. Kappos
*Director of the United States Patent and Trademark Office*

CERTIFICATE OF CORRECTION (continued)
U.S. Pat. No. 7,818,431 B2

In column 8, line 17, after "formats" insert -- , --.

In column 8, line 29, delete "EEPROM)" and insert -- EPROM) --, therefor.

In column 8, line 42, delete "resent" and insert -- present --, therefor.